United States Patent Office 3,076,048
Patented Jan. 29, 1963

3,076,048
ALKYLATION PROCESS
Joe T. Kelly, Lake Charles, La., and William Schoen, Houston, Tex., assignors, by mesne assignments, to Standard Oil Company, Chicago, Ill., a corporation of Indiana
No Drawing. Filed Sept. 22, 1960, Ser. No. 57,631
8 Claims. (Cl. 260—683.53)

This invention relates to alkylation of olefins and isoparaffins utilizing aluminum chloride-dialkyl ether complex catalyst. More particularly, it relates to a process providing higher octane number alkylate and longer catalyst life.

There is presently known a process for production of alkylate by the reaction of olefins and isoparaffins in the presence of a liquid catalyst commonly considered to be a complex of aluminum chloride and dialkyl ether. This catalyst contains more than 1 mole of aluminum chloride per mole of ether but less than 2 moles of aluminum chloride per mole of ether. The complex containing an equimolar amount of aluminum chloride and of ether is inactive. This catalyst system reacts with the hydrocarbon charged to produce, gradually, a complex of aluminum chloride and hydrocarbon. The presence of this aluminum chloride-hydrocarbon complex decreases the activity of the ether complex catalyst system. It has been found that the octane number of the alkylate produced by reacting isoparaffins and olefins containing more than 2 carbon atoms can be greatly improved by having present in the reaction zone an aromatic hydrocarbon inhibitor; this inhibitor apparently suppresses the ability of the ether catalyst system to isomerize the initial product to isomers of lower octane number. The aromatic inhibitors increase the amount of aluminum chloride-hydrocarbon complex produced.

It is the object of this invention to utilize the above-described aluminum chloride-ether complex catalyst along with inhibitors which will permit high octane number product at a minimum of wastage of hydrocarbon to aluminum chloride-hydrocarbon complex. Other objects will become apparent in the course of the detailed description of the invention.

It has been discovered that alkylate of improved octane number and that the build-up of aluminum chloride-hydrocarbon complex is decreased by having present in the liquid catalyst phase of an aluminum chloride-ether complex catalyst alkylation process involving an isoparaffin and an olefin containing more than 2 carbon atoms, a metal halide. The halogen from which the halide is derived is either chlorine, bromine or iodine. The metal portion of the halide is derived from either lithium or sodium. In the case of lithium halide, the usage of salt is usually from 0.1 to about 1.0 mole per mole of free-aluminum chloride present in the catalyst phase. In the case of sodium halide, the usage of salt is usually from about 0.1 to about 0.7 mole per mole of free-aluminum chloride present in the catalyst phase. The term "free-aluminum chloride" is intended to mean that aluminum chloride present in the catalyst phase in excess of 1 mole of aluminum chloride per mole of the particular ether present.

The process of the invention is applicable to olefins containing 3, 4 or 5 carbon atoms and mixtures thereof. The isoparaffins charged to the process of the invention contain 4 or 5 carbon atoms and may be mixtures of these. Butene-2 is a particularly suitable olefin for the production of very high octane number alkylate product. Isobutane is a preferred isoparaffin. (The metal halides inhibit the catalytic activity of the $AlCl_3$-ether complex catalyst system sufficiently that ethylene alkylation is not a practical embodiment.) The isoparaffins and olefins are contacted in the presence of the liquid catalyst phase in amounts such as are normally used for $AlCl_3$-type catalyst alkylation processes or any of the conventional acid catalyst systems such as sulphuric acid and hydrofluoric acid. In the process of the invention, the lower ratio of isoparaffin/olefin usually charged to the reaction zone is at least 3. Higher ratios may be used. Under some conditions, the ratio of isoparaffin/olefin in the reaction zone may be as much as 100. More usually, this ratio, in the process of this invention, is from 3 to about 25.

The alkylation reaction is carried out in the liquid state and sufficient pressure is maintained on the system to keep the reactants essentially entirely liquid. The alkylation reaction in the process of the invention is carried out at a temperature such as is typical of $AlCl_3$-type alkylation processes. More specifically, herein, the reaction is at a temperature of from about 0° F. to about 70° F. In general, the octane number of the alkylate product increases as the temperature of the alkylation is lowered. It is preferred to operate at the lower end of the temperature range and suitably at 5–25° F. The effective catalyst utilized in the process of the invention consists essentially of aluminum chloride and a dialkyl ether. The catalyst contains more than an equimolar amount of aluminum chloride and ether. Less than 2 moles of aluminum chloride are present per mole of ether. It is thought that the actual catalyst is aluminum chloride physically dissolved in an $AlCl_3$-ether complex which complex contains about 1 mole of $AlCl_3$ per mole of ether. A complex containing an equimolar amount of $AlCl_3$ and ether is completely inactive for promoting the alkylation of the defined olefins and isoparaffins. The presence of $AlCl_3$ beyond the 1:1 ratio requirement produces an active catalyst system. (In the prior art the composition of the catalyst system has been in terms of the molar ratio of aluminum chloride to ether present in the catalyst phase present in the reaction zone. For clarity, hereinafter, the active catalyst system will be defined as a 1:1 complex containing physically dissolved $AlCl_3$. This physically dissolved $AlCl_3$ is hereinafter referred to as "free-$AlCl_3$".)

Even a trace amount of free-$AlCl_3$ produces some catalytic activity. Activity of a significant degree for many reactant combinations is obtained with about 0.5 weight percent of free-$AlCl_3$. The free-$AlCl_3$ content is always stated in terms of the 1:1 complex present in the reaction zone or in the catalyst preparation zone. Increasing the amount of free-$AlCl_3$ present has beneficial effect on the activity and on catalyst activity maintenance. Usually, it is desirable to operate with a complex which is essentially saturated with free-$AlCl_3$ at the particular temperature of operation. For example, a complex formed from dimethyl ether or diethyl ether will dissolve about 15 weight percent of free-$AlCl_3$ at 75° F.

The liquid catalyst system is capable of maintaining in relatively stable dispersion, a considerable weight of finely divided aluminum chloride. It is thought that this dispersed solid aluminum chloride does not participate in the catalytic activity. However, as free-$AlCl_3$ is extracted from the catalyst phase either by reaction to produce aluminum chloride-hydrocarbon complex or solution into the alkylate product leaving the reaction zone, the dispersed solid aluminum chloride dissolves and permits operation for a longer period at maximum catalyst activity. In general, it is preferred that the free-$AlCl_3$ content of the catalyst phase be maintained at the desired level by the well known techniques other than through the presence of dispersed solid aluminum chloride.

The complex consists of aluminum chloride and dialkyl ether. In the process of the invention, it is preferred that the ether be a di-n-alkyl ether wherein each of the n-alkyl groups contains 1, 2, 3 or 4 carbon atoms. The particular n-alkyl groups are methyl, ethyl, n-propyl and n-butyl.

Illustrative ethers are dimethyl ether, diethyl ether, methylethyl ether, di-n-propyl ether, methyl-n-propyl ether, and di-n-butyl ether. In low temperature operation, a physical mixture of dimethyl ether and diethyl ether has been found to be particularly useful. Another particularly suitable combination of ethers for use in low temperatures is the equilibrium mixture of diethyl ether, dimethyl ether and methylethyl ether.

In the alkylation zone, there is present a liquid catalyst phase. This phase includes the hereinbefore defined catalyst system. Also present is aluminum chloride-hydrocarbon complex formed by reaction of free-$AlCl_3$ and hydrocarbon. The hydrocarbon complex is almost completely miscible with the ether complex. The amount of hydrocarbon complex present is dependent upon the operating conditions and the inhibitor present.

Also present in the catalyst phase, in the process of the invention, is a metal halide. The metal halide contains the halide ion, chloride, bromide or iodide and the metal ion, lithium or sodium. Although there is added to the catalyst phase the particularly defined metal halide, it is to be understood that the metal halide may not exist in the catalyst phase in the state in which it was added. It is known that sodium chloride very rapidly reacts with free-$AlCl_3$ to form the adduct sodium aluminum tetrachloride. It has been observed that the potassium salts and the lithium and sodium fluorides are either insoluble in the catalyst system or have no effective inhibiting power.

The metal halide inhibitor shows beneficial effects on octane number of the alkylate product and the amount of aluminum chloride-hydrocarbon complex formed as soon as any is added to the liquid catalyst phase in the reaction zone. The beneficial effect increases with increased amount of inhibitor added, up to a point. With lithium halides, it appears that substantially maximum benefits are obtained at a usage of about 1 mole of lithium halide per mole of free-$AlCl_3$ present in the catalyst phase. Substantial improvements are obtained starting at about 0.1 mole of lithium halide added. In the case of sodium halide, the inhibiting benefit disappears when the amount of halide added is about 1 mole per mole of free-$AlCl_3$ present; the sodium halide-aluminum chloride adduct has no inhibiting effect or catalytic effect. With sodium halides, the usage falls within the range of about 0.1–0.7 mole per mole of free-$AlCl_3$.

The defined metal halides are soluble to a large extent in the catalyst system. It has been observed that the presence of olefin in the catalyst preparation zone greatly increases the "solubility" of the metal halide being added. The presence of metal halide in excess of that soluble in the liquid catalyst phase does not have any deleterious effects.

The process of the invention produces substantial yield of alkylate of excellent octane number without the deliberate addition of halide promoter for $AlCl_3$-type catalyst. Suitable halide promoters are hydrogen chloride and alkyl halides such as t-butyl chloride. High catalyst activity and long catalyst activity maintenance requires the presence of halide promoter. Hydrogen chloride is a preferred promoter. The amount of halide promoter added is dependent upon the particular conditions of operation. In general, the minimum amount of halide promoter consistent with the desired activity maintenance is used. Illustrative of halide promoter usage is the addition of hydrogen chloride in an amount from 0.1 to 5 weight percent based upon the total hydrocarbon charged to the reaction zone, i.e., the sum of isoparaffin and olefin introduced into the reaction zone.

It is to be understood that the contacting of the reactants and the liquid catalyst phase may be carried out in any process vessel providing intimate intermingling of the hydrocarbon liquid and the catalyst phase. Numerous operating procedures are known in the alkylation art and it is intended that any one of these may be used with the process of the instant invention.

EXAMPLES

The process of the invention is illustrated by certain working examples carried out in a semi-batch operation. For purposes of comparison, tests utilizing the basic prior art process and a prior art inhibited process are also set forth hereinafter.

All of the illustrations utilized essentially pure isobutane and butene-2 as the reactants. The complex was made up with CP aluminum chloride and an equimolar mixture of dimethyl ether and diethyl ether. The 1:1 $AlCl_3$-ether complex was fortified with aluminum chloride. With the exception of one test, the complex was essentially saturated with aluminum chloride: At the 50° F. temperature of operation, the free-aluminum chloride content was 12 weight percent. In one test, the free-aluminum chloride amounted to 9 weight percent. In those tests wherein metal halide inhibitor was used, finely divided anhydrous salt was added to the catalyst system in the amount desired in the reaction vessel to provide the mole ratio of inhibitor to free-$AlCl_3$ present.

The reaction vessel was a 1 liter steel autoclave provided with four vertical baffles positioned at the wall to improve agitation provided by a 2" propeller driven at 1800 r.p.m. by an electric motor. The reaction vessel was positioned in a bath which permitted maintaining the reactor at the desired temperature—in these tests 50° F.

In each test, 15 ml. of the catalyst system was added to the reactor along with 650 ml. of isobutane: All of the isobutane was present in the reactor. After the contents of the reactor had been brought to 50° F., butene-2 was added to the reactor at a rate of 2 ml. per minute. A total of 120 ml. of butene-2 was charged over a period of one hour. After all of the olefin was added, the agitation was continued for 3–5 minutes. It was observed that the olefin reacted with great rapidity and the additional contacting time after olefin addition was stopped was more or less precautionary rather than necessary.

The propeller was stopped and the contents of the reactor permitted to settle. A siphon tube was used to remove substantially all of the isobutane and alkylate: This material was drawn off into a Dry Ice cooled vessel. Dry Ice was used to solidify the liquid catalyst phase present in the reactor. The liquid hydrocarbon remaining in the reactor was then decanted from the solid catalyst phase and added to the first quantity of hydrocarbon removed.

The butane was removed from the alkylate in a stabilizing column. The total alkylate bottoms were water washed to remove catalyst phase and dried over potassium carbonate. The dried alkylate was weighed to obtain the yield in the particular test. In all tests reported herein, the yield of alkylate is the weight of total alkylate based on the weight of butene-2 charged. (A yield of only octane product would be 204 weight percent based on butene-2 charged.)

The dried total alkylate was distilled to remove an overhead fraction having an ASTM distillation end point of 350° F. The fraction boiling above 350° F. end point is termed "heavy ends." The CFR-R clear octane number of the alkylate overhead product was obtained. In some tests, analysis by carbon number was obtained on the overhead alkylate product. In those tests which illustrate one embodiment of the invention herein, the 8 carbon atom containing fraction was on the order of 97% of the overhead alkylate product.

The amount of aluminum chloride-hydrocarbon complex formed during the particular test was determined as a measure of the catalyst life. The aluminum chloride-hydrocarbon complex was not determined as such. It has been determined that the amount of "red oil" present in the catalyst phase at the end of the test effectively demonstrates the amount of aluminum chloride-hydrocarbon complex formed. The solidified catalyst phase was melted and weighed. The catalyst phase was then decomposed with water. A supernatant layer of liberated ether and red oil forms which supernatant layer was decanted away from the aqueous layer. The ether was separated from the red oil by distillation. The recovered red oil was weighed. The amount of red oil formed during the test is reported as weight percent based on the total catalyst phase existing in the reactor at the end of the test. This catalyst phase consists of aluminum chloride-ether complex, free $AlCl_3$, aluminum chloride-hydrocarbon complex and trace amounts of hydrocarbon.

In the table below are reported tests using lithium chloride, in various amounts, sodium chloride, in various amounts, lithium bromide and sodium bromide at a given single amount. Lithium fluoride and sodium fluoride tested at a usage of 1 mole per mole of free-$AlCl_3$ had no beneficial effects.

For purposes of comparison, test Number 1 was carried out in the absence of any inhibitor. The effectiveness of this catalyst system is demonstrated by the 212 percent yield in spite of 8.8% red oil production.

The inhibited process of U.S. Patent Number 2,897,248 is illustrated by run Number 11 wherein hexaethylbenzene was added along with the butene-2: The hexaethylbenzene was used in an amount of 0.5 weight percent based on the total of isobutane and butene-2.

The test set out in the table shows that lithium chloride reduces the red oil formation markedly: As the amount of lithium chloride used was increased, the octane number increased to 100 with some decrease in yield—the red oil formation was only ¼ of the comparison test Number 1. Test Number 11 shows that lithium chloride is essentially as effective in octane number improvement and yield of product as the hexaethylbenzene inhibitor and produces only about ⅕ of the red oil.

The sodium chloride test shows that this is an effective inhibitor with respect to both octane number improvement and red oil suppression, to a point. Test Number 8 and test Number 10 show that sodium halides kill the catalyst system when used in molar amounts equaling the amount of free-$AlCl_3$ present.

*Table*

| Test | Inhibitor [1] | Mole ratio inhibitor: free-$AlCl_3$ [2] | Yield total alkylate [3] | Clear CFR-R, 350° F. alkylate | Red oil [4] |
|---|---|---|---|---|---|
| 1 | None | | 212 | 93.4 | 8.8 |
| 2 | LiCl | 0.5 | 204 | 94.8 | 5.3 |
| 3 | LiCl | 0.75 | 200 | 98.0 | 3.7 |
| 4 | LiCl | 1.0 | 187 | 100.0 | 1.9 |
| 5 | LiCl | 1.0 | 195 | 99.5 | 2.6 |
| 6 | NaCl | 0.33 | 203 | 96.2 | 2.0 |
| 7 | NaCl | 0.67 | 174 | 99.3 | 2.0 |
| 8 | NaCl | 1.0 | None | | |
| 9 | LiBr | 1.0 | 179 | 98.4 | 3.1 |
| 10 | NaBr | 1.0 | None | | |
| 11 | ([5]) | | 191 | 100.6 | 9.7 |

[1] LiF and NaF had no beneficial effect.
[2] 12% free-$AlCl_3$ except 9% in Test 5.
[3] Wt. % based on butene-2 charged.
[4] Wt. % based on catalyst phase present at end of test.
[5] Hexaethylbenzene —0.5 Wt. % added based on hydrocarbon reactants.

Thus having described the invention what is claimed is:

1. An alkylation process comprising contacting, in the liquid state, an olefin having 3–5 carbon atoms and an isoparaffin having 4–5 carbon atoms in a mole ratio of isoparaffin/olefin of at least 3, at a temperature from about 0° F. to about 70° F., to obtain a branched chain alkylate, said contacting being carried out in the presence of a liquid catalyst phase consisting essentially of $AlCl_3$-di-n-alkyl ether complex containing about one mole of $AlCl_3$ per mole of ether, each of said n-alkyl groups containing 1–4 carbon atoms, free-$AlCl_3$ dissolved in said complex in an amount of from about 0.5 weight percent, based on said complex, to the saturation amount at the temperature of operation, and about 0.1–1.0 moles of lithium halide inhibitor per mole of said free-$AlCl_3$, said halide ion being selected from the class consisting of chloride, bromide and iodide, and hydrogen chloride promoter for the catalyst, and recovering said alkylate from catalyst phase and unreacted hydrocarbons.

2. The process of claim 1 wherein said inhibitor amount is about 1 mole per mole of said free-$AlCl_3$.

3. The process of claim 1 wherein said temperature is about 5–25° F.

4. The process of claim 1 wherein said ether is dimethyl ether.

5. The process of claim 1 wherein said ether is about the equilibrium mixture of dimethyl ether, diethyl ether and methylethyl ether.

6. The process of claim 1 wherein said isoparaffin is isobutane.

7. The process of claim 6 wherein said olefin is butene-2.

8. An alkylation process comprising contacting, in the liquid state, an olefin having 3–5 carbon atoms and an isoparaffin having 4–5 carbon atoms in a mole ratio of isoparaffin/olefin of at least 3, at a temperature from about 0° F. to about 70° F., to obtain a branched chain alkylate, said contacting being carried out in the presence of a liquid catalyst phase consisting essentially of $AlCl_3$-di-n-alkyl ether complex containing about one mole of $AlCl_3$ per mole of ether, each of said n-alkyl groups containing 1–4 carbon atoms; free-$AlCl_3$ dissolved in said complex in an amount of from about 0.5 weight percent, based on said complex, to the saturation amount at the temperature of operation; a metal halide inhibitor, in said catalyst phase, which inhibitor is selected from the class consisting of lithium chloride, lithium bromide, lithium iodide, sodium chloride, sodium bromide and sodium iodide; wherein the amount of said inhibitor present, in moles per mole of free-$AlCl_3$ present, is about 0.1–1.0 when said inhibitor is one of said lithium halides and is about 0.1–0.7 when said inhibitor is one of said sodium halides; and hydrogen halide promoter for the catalyst, and recovering said alkylate from catalyst phase and unreacted hydrocarbons.

References Cited in the file of this patent

UNITED STATES PATENTS

| 2,180,374 | Stahly et al. | Nov. 21, 1939 |
| 2,296,511 | Frey et al. | Sept. 22, 1942 |
| 2,897,248 | Roebuck et al. | July 28, 1959 |